June 22, 1965
K. B. MAGLEBY ETAL 3,191,072
HIGH FREQUENCY SAMPLER TRIGGER CIRCUITS INCLUDING SIGNAL FEEDBACK TO REGULATE SWITCHING TIMES TRIGGER CIRCUITS
Filed Feb. 28, 1963
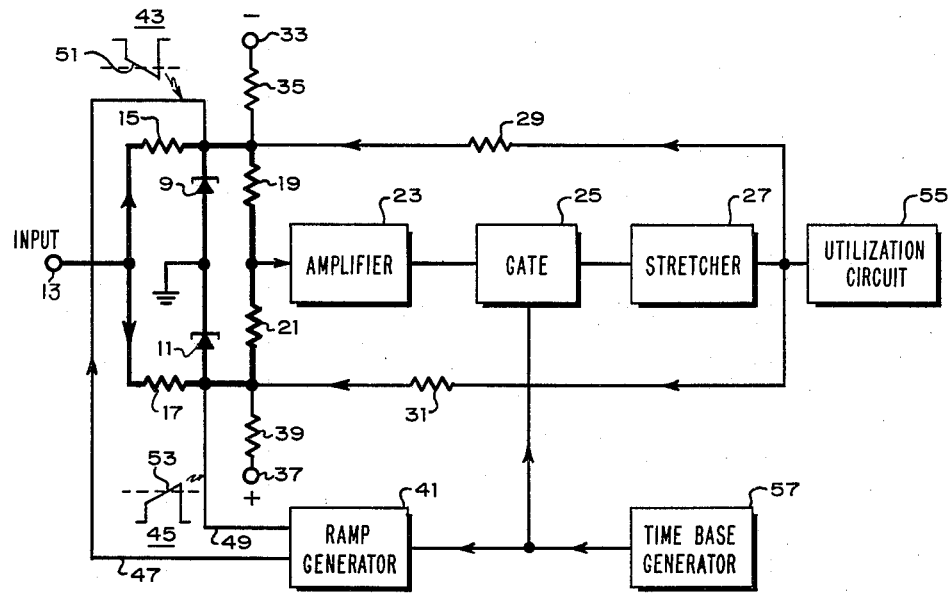
KEY:  TUNNEL DIODE
INVENTORS
KAY B. MAGLEBY
GIACOMO VARGIU
BY *Albert C. Smith*
AGENT

United States Patent Office 3,191,072
Patented June 22, 1965

3,191,072
HIGH FREQUENCY SAMPLER TRIGGER CIRCUITS INCLUDING SIGNAL FEEDBACK TO REGULATE SWITCHING TIMES OF TRIGGER CIRCUITS
Kay B. Magleby, San Jose, and Giacomo Vargiu, Palo Alto, Calif., assignors to Hewlett-Packard Company, Palo Alto, Calif., a corporation of California
Filed Feb. 28, 1963, Ser. No. 261,778
4 Claims. (Cl. 307—88.5)

This invention relates to sampling circuits and more particularly to a balanced tunnel diode circuit which produces a slowly-varying display signal from a number of samples taken at different sampling instants along a rapidly recurrng waveform under examination.

Sampling circuits are used to reproduce rapidly recurring waveforms as a series of sample signals having amplitudes which vary with the amplitude of the sampled waveform at successive sampling instants. These circuits find wide application in sampling oscilloscopes wherein the waveform under examination is displayed as a series of dots or samples during a time occupied by a selected number of recurrences of the waveform. One difficulty encountered in using sampling circuits in such applications is the low sampling efficiency and distortion of sample signals due to the distributed capacity of the sampling gates and associated circuits. One scheme for improving the sampling efficiency and for minimizing sample signal distortion uses plural series sampling gates and positive feedback as discussed in U.S. Patent 3,011,129, issued on November 28, 1961, to K. B. Magleby et al.

In applications requiring sampling of extremely high frequencies, it is essential that the sample signal have a duration which is considerably shorter than the half period of the waveform under examination. This requires that the sampling gate be switched from the normally nonconductive state to the conductive state and back again in times considerably shorter than a milli-microsecond. A simpler method of deriving a sample pulse is to initiate the sample signal using one conductive element and to terminate the sample signal using another conductive element. A sample signal created in this manner has shorter duration and much sharper rise and fall times because operating conditions for each of the conduction elements can be optimized to provide maximum switching speed in one direction. If the relative times at which the conduction elements change conductivity is varied in response to the amplitude at the sampling instant of the waveform under examination, then the sample signal thus derived contains pulse width information about the amplitude of the waveform under examination at the sampling instant. Suitable means to convert the pulse width information to amplitude information thus yields the desired sample signal.

Accordingly, it is a principal object of the present invention to provide a sampling circuit which produces pulse width information of the waveform under examination at successive sampling instants.

It is another object of the present invention to provide an improved sampling circuit for sampling applied signals having frequencies of the order of several kilomegacycles.

In accordance with the illustrated embodiment of the present invention, a pair of tunnel diodes are connected to receive sampling command signals of opposite polarity and having amplitudes which increase with time. The input signal is applied to each of the tunnel diodes in combination with the sampling command signals. The switching time of the tunnel diode which receives the signals of same polarity is advanced and the switching time of the tunnel diode which receives the signals of opposite polarity is retarded. Means are provided to produce a voltage which is related to the difference in the switching times of the tunnel diodes. This voltage is applied to the tunnel diodes in opposite phase relationship to the amplitude of the input signal. This tends to restore the switching times of the tunnel diodes to the normal switching time which occurs in the absence of an input signal.

Other and incidental objects of the present invention will be apparent from a reading of this specification and an inspection of the accompanying drawing which shows a schematic diagram of one embodiment of the present invention.

Referring to the drawing, there is shown a pair of tunnel diodes 9 and 11 each having one terminal connected to ground. Input signal appearing on terminal 13 is applied to the tunnel diodes 9 and 11 through resistors 15 and 17. The signals appearing across the tunnel diodes are combined in resistors 19 and 21 and are applied to the input of amplifier 23. The output of amplifier 23 is connected to the utilization circuit 55 through gate 25 and stretcther 27. The signal appearing at the output of stretcher 27 is returned to the tunnel diodes 9 and 11 through resistors 29 and 31. Bias current for tunnel diode 9 is supplied from the supply terminal 33 through resistor 35 and bias current for tunnel diode 11 is supplied from supply terminal 37 through resistor 39. Ramp generator 41 produces sampling command signals 43 and 45 on lines 47 and 49, respectively, in response to signal applied thereto from the time base generator 57. These sample command signals have substantially the same shape but are opposite in polarity and are applied to tunnel diodes 9 and 11 along lines 47 and 49.

In the absence of signal at input terminal 13 the sampling command signals 43 and 45 cause tunnel dioes 9 and 11 to switch operating states substantially at the same instant. Thus, the signals across the tunnel diodes 9 and 11 when combined in resistors 19 and 21 produce no signal at the input of amplifier 23. Each of the tunnel diodes 9 and 11 is biased below the low-voltage current peak and thus may be triggered into the high voltage conduction state by an additional signal applied thereto of sufficient amplitude and polarity. This occurs at some point along the ramp portion 51 and 53 of the sampling command signals 43 and 45. It should be understood that any trigger circuit such as a blocking oscillator or Schmitt trigger which has a critical signal level below which no switching occurs and above which switching occurs may be used in place of tunnel diodes. Slight imbalances in the switching characteristics of the tunnel diodes 9 and 11 may be compensated for by an adjustment of the bias current in either of resistors 35 or 39.

Signal appearing at input terminal 13, say of instantaneous positive polarity, is combined with the negative-going sampling command signal 43 and is applied to tunnel diode 9. At the same time the input signal is combined with the positive-going sampling command signal 45 and is applied to tunnel diode 11. The combination of the positive input signal and the positive-going sampling command signal 45 causes tunnel diode 11 to switch to the high voltage conduction state at an earlier time than would normally occur in the absence of input signal. This change of conduction state of the tunnel diode initiates an output pulse which is applied through resistor 21 to the input of amplifier 23. The combination of signals applied to tunnel diode 9 causes it to switch to its high voltage conduction state at a later time than would normally occur in the absence of input signal. This change in conduction state of tunnel diode 9 produces a voltage across the diode which equals and opposes the voltage across diode 11. The pulse appearing at the input of amplifier 23 is thus terminated. The width of the signal at the input of amplifier 23 is determined by the amplitude of the signal appearing at the input terminal 13. This signal is amplified by amplifier 23 and is applied to the stretcher 27 through gate 25. Gate 25 is rendered conductive by signal applied thereto from the time base generator 57 for a period of time which is sufficiently long to pass the signal produced by the first transitions in the conductivity of tunnel diodes 9 and 11. The gate is then rendered non-conductive and subsequent transitions in the conductivity of the diodes 9 and 11 during a reset cycle do not affect the signal applied to the stretcher 27. The stretcher 27 includes an integrating circuit for producing an output signal which is related in amplitude to the width of the signal applied to the input of the stretcher. After gate 25 is opened, the tunnel diodes 9 and 11 are reset to the low voltage conduction states by the decrease in the amplitudes of the sampling command signals 43 and 45. The signal appearing at the output of stretcher 27 is applied to utilization circuit 55 which may include the deflection plates of a cathode-ray tube. The stretcher output is also returned to resistors 29 and 31 to the tunnel diodes 9 and 11. This signal has a polarity which is opposite to the polarity of the input signal. Thus when this signal is applied to the tunnel diodes 9 and 11 it tends to cancel the effect of the input signal upon the switching times of the tunnel diodes, thereby tending to restore the switching times of the diodes to that which would normally occur in the absence of input signal. This feedback circuit tends to maintain the switching times of the diodes constant for all amplitudes of signal at input terminal 13. Slight advances or retardations of the switching times of the tunnel diodes 9 and 11 about the normal switching time constitutes an error signal from which the output of stretcher 27 may be produced. This error signal is related to the open loop shift in switching times by the gain of the amplifier 23. For very high gain in amplifier 23 the signal at the output of stretcher 27 is substantially equal and opposite to the signal at input terminal 13. The desired output signal at terminal 25 is thus an accurate representation of the sampled amplitude of the signal at terminal 13.

Therefore the sampling circuit of the present invention provides simple and efficient means for deriving samples of a high frequency applied waveform.

We claim:
1. A sampling circuit comprising:
   a pair of regenerative trigger means, each operative only in either one of two operating states in response to a signal applied thereto attaining a selected threshold value to produce an output signal indicative of the operating state of the trigger means;
   a generator for producing a pair of sampling command pulses, each having a time-varying amplitude between the leading and trailing edges thereof;
   means connected to said trigger means for applying thereto the combination of a signal to be sampled and said sampling command pulses from said generator for advancing the time at which one of said trigger means changes operating states in response to said combination of signals attaining said threshold value and for delaying the time at which the other trigger means changes operating states in response to said combination of signals attaining said threshold value;
   circuit means connected to said pair of trigger means for producing a signal having an amplitude related to the difference in time of the changes in operating states of said trigger means; and
   means connecting the output of said circuit means to said trigger means for applying the signal appearing at the output of said circuit means to said trigger means in phase opposition to the signal to be sampled applied thereto.

2. A sampling circuit comprising:
   a pair of regenerative trigger means, each including a tunnel diode operative only in either one of two operating states in response to a signal applied thereto attaining a selected threshold value for the trigger means to produce output signal of opposite polarities indicative of the operating state of the trigger means;
   a generator for producing a pair of sampling command pulses of opposite polarities, each having a time-varying amplitude between the leading and trailing edges thereof;
   means connected to said trigger means for applying thereto the combination of a signal to be sampled and said sampling command pulses from said generator for advancing the time at which one of said trigger means changes operating states in response to said combination of signals attaining said threshold value and for delaying the time at which the other trigger means changes operating states in response to said combination of signals attaining said threshold value;
   circuit means connected to said pair of trigger means for producing a signal having an amplitude related to the difference in time of the changes in operating states of said trigger means; and
   means connecting the output of said circuit means to said trigger means for applying the signal appearing at the output of said circuit means to said trigger means in phase opposition to the signal to be sampled applied thereto.

3. A sampling circuit comprising:
   a pair of serially-connected tunnel diodes having the common terminal thereof connected to a reference potential;
   a first pair of resistors serially connected between the end terminals of the serially-connected tunnel diodes;
   means connected to apply the signal to be sampled to the common terminal of said first pair of resistors;
   a source of timing signal;
   a generator for producing time-varying signals of opposite polarity in response to a timing signal applied thereto from said source;
   means connecting said generator and said tunnel diodes;
   the time at which one of said tunnel diodes changes operating states being advanced in response to the combination of current supplied by one of said time-varying signals and the current supplied by the signal to be sampled and applied thereto;
   the time at which the other tunnel diode changes operating states being delayed in response to the combination of the current supplied by another of said time-varying signals and the current supplied by the signal to be sampled and applied thereto;
   second and third pairs of resistors serially connected between the end terminals of the serially-connected tunnel diodes;
   a gate connected to the common terminal of the second pair of serially connected resistors;
   a stretcher circuit for producing an output signal having an amplitude which is related to the width of a signal applied thereto;
   means connecting the output of said gate and the input of said stretcher circuit;
   said gate being rendered conductive in response to said timing signal applied thereto from said source for applying the signal appearing at the common terminal of said second pair of resistors to said stretcher circuit; and
   means connecting the output of said stretcher circuit to the common terminal of the third pair of resistors for applying said output signal to said tunnel diodes in polarity opposition to said signal to be sampled applied thereto.

4. A sampling circuit comprising:

a pair of tunnel diodes connected to receive the signal to be sampled;

a source of timing signals;

a generator for producing time-varying signals of opposite polarity and time-varying amplitude in response to a timing signal applied thereto from said source;

means connecting said generator and said tunnel diodes for applying the signals of opposite polarity thereto;

the time at which one of said tunnel diodes changes operating states being advanced in response to the combination of one of said time-varying signals and the signal to be sampled applied thereto attaining the peak current value of said one tunnel diode;

the time at which the other tunnel diode changes operating states being delayed in response to the combination of another of said time-varying signals and the signal to be sampled applied thereto attaining the peak current value of said other tunnel diode;

said tunnel diodes producing signals of opposite polarity thereacross indicative of the changed operating states;

a gate connected to be actuated by said timing signal;

a pulse-width-to-signal amplitude converting circuit for producing an output signal having an amplitude which is related to the width of a pulse applied thereto;

means including said gate rendered conductive in response to said timing signal applied thereto from said source for connecting said converting circuit to receive the combination of signals appearing across said tunnel diodes; and means connecting the output of said converting circuit and said tunnel diodes for applying said output signal to said tunnel diodes in polarity opposition to said signal to be sampled applied thereto.

References Cited by the Examiner

UNITED STATES PATENTS

| | | | |
|---|---|---|---|
| 2,722,605 | 11/55 | Mills | 328—133 X |
| 2,838,690 | 6/58 | Eckert | 307—88.5 |
| 3,011,129 | 11/61 | Magleby et al. | 328—73 X |
| 3,075,087 | 1/63 | Lo. | |
| 3,116,425 | 12/63 | Kaenel. | |

JOHN W. HUCKERT, *Primary Examiner.*